Jan. 1, 1929.
W. H. CHAPMAN ET AL
1,697,046
TOOL SPINDLE MOUNTING
Filed Dec. 3, 1923
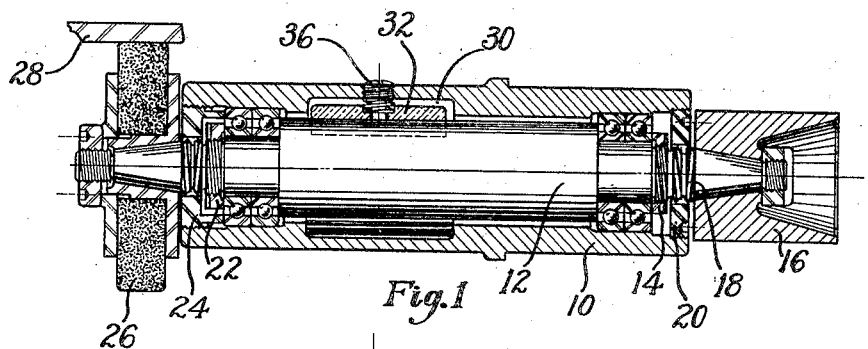
Fig.1
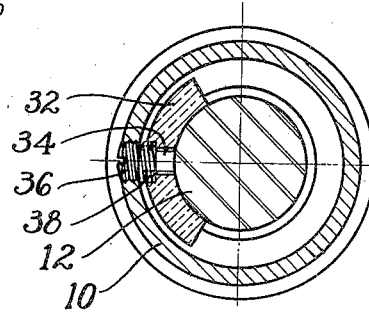
Fig.2
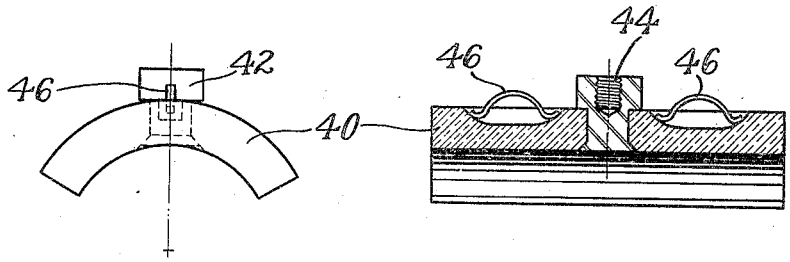
Fig.3
Fig.4.
Inventors
William H. Chapman,
Philip H. Hutchinson,
by
Their Attorney.

Patented Jan. 1, 1929.

UNITED STATES PATENT OFFICE.

1,697,046

WILLIAM H. CHAPMAN, OF MONTCLAIR, AND PHILIP H. HUTCHINSON, OF EAST ORANGE, NEW JERSEY, ASSIGNORS TO GENERAL MOTORS CORPORATION, OF DETROIT, MICHIGAN, A CORPORATION OF DELAWARE.

TOOL-SPINDLE MOUNTING.

Application filed December 3, 1923. Serial No. 678,110.

This invention relates to tool spindle mountings and is herein shown as an antichattering device for grinding wheel spindles.

When a grinding wheel, carried on a spindle rotatably mounted in bearings at the ends of a quill or housing, is brought into engagement with a piece of work, the pressure of the work causes a deflection of the spindle. The pulley, usually carried at the opposite end of the spindle, by reason of the belt pull, also tends to deflect the spindle and the resultant deflection, particularly if there is any looseness in the bearings, causes chattering and mars the surface of the work. It is an object of this invention to prevent this undesired chattering and deflection of the spindle. In accordance with this feature, a pad is continuously pressed against the unsupported middle part of the spindle, preferably on the side where the work is presented to the tool. The spindle is therefore constrained to revolve accurately on a straight axis and the quality of work is enhanced.

To these ends and also to improve generally on devices of this character, the invention also consists in the various matters hereinafter described and claimed.

Referring to the drawings:

Figure 1 is a longitudinal section through the housing of an internal grinding spindle.

Figure 2 is an enlarged vertical section.

Figure 3 is an enlarged end view of a different construction of pad, and

Figure 4 is a central longitudinal section through the pad of Figure 3.

The numeral 10 indicates a quill or housing which surrounds and supports a spindle 12 which rotates at high speed. The spindle is shouldered near the pulley end, and against this shoulder, are clamped by a nut 14, two inner race rings of an antifriction bearing having rollers in the form of balls. The end of the housing has a cylindrical recess in which the outer race rings of the ball bearing can float longitudinally. A belt pulley 16 is clamped to the cone-shaped end of the spindle and, where the spindle enters the housing, the former is provided with right and left threads 18 which engage, with a slight clearance, a smooth bore in the nut 20. The right and left threads retain lubricant in the housing and exclude dust and grit.

The spindle 12 is also shouldered near the other end and two inner race rings of a ball bearing are clamped against the shoulder by a nut 22. The outer race rings of the ball bearings are fixed in a recess of the housing by a nut 24 threaded externally into said recess. The nut 24 also has a smooth bore surrounding right and left threads on the spindle. This end of the spindle has fixed to it a tool 26, here shown as a grinding wheel, for grinding the interior surface 28 of a piece of work.

The middle part of the housing has a recess 30 in which is supported a pad 32, preferably of bronze or other suitable bearing material. The pad is segmental and has a cylindrical surface conforming to a large area of the unsupported middle part of the spindle 12 remote from both bearings but nearer to the bearing at the tool end. The pad has a central opening into which projects an extension or pilot 34 formed as a part of a screw 36 threaded in an opening which extends radially through the housing. The pad also has a recess of larger diameter than the extension 34, said recess receiving one end of a coiled spring 38, the other end of the spring bearing against the screw 36. The pad is preferably placed on that side of the spindle at which the work is presented to the grinding wheel and the pressure of the spring may be varied by turning the screw.

Figures 3 and 4 show a different pad 40 which carries a projecting pin or dowel 42 the reduced portion of which is riveted into an opening through the pad. The pin is tapped as at 44 so that, when the spindle is being placed in the housing, a screw can be inserted into the tapped opening to hold the pad out of the way. The periphery of the pin or dowel 42 is smooth and fits loosely in a radial opening in the housing. For pressing the pad against the spindle two leaf springs 46 are inserted in recesses of the pad and have their middle bowed portions arranged to engage the inside of the housing. In use, the pad exerts a pressure on the spindle sufficient to take up any small amount of play that may occur from the pressure due to the work and the belt pull and hence deflection of the spindle is avoided and the spindle is accordingly constrained to rotate on a straight axis at all times.

Although the invention has been shown and described by reference to a specific construction, it should be understood that, in its broader aspects, the invention is not necessarily limited to the precise construction selected for illustrative purposes.

We claim:

1. In a spindle mounting or the like, a casing, a spindle extending therethrough with its ends projecting and provided respectively with a tool and a pulley, annular roller bearings in said casing between it and the spindle and adjacent the said tool and the said pulley respectively, and a spring-pressed pressure-shoe engaging said spindle between the said roller bearings and at a point nearer to the said bearing adjacent the tool than to said other bearing, the pressure of the spring upon the spindle being in the direction of that exerted by the work upon the tool, whereby notwithstanding wear of the bearings the pulley belt can constantly hold the adjacent spindle-end and its bearing parts closely pressed upon the casing in the direction opposite to that of the pressure exerted by the work upon the tool, and the tool-carrying end of the spindle and its adjacent bearing parts are constantly closely pressed upon the casing in the direction of the pressure exerted upon the tool by the work,—so that chattering of the spindle is avoided notwithstanding the use of roller bearings, and only a single pressure-member is required; substantially as described.

2. In a spindle mounting or the like, a casing, a spindle extending therethrough with its ends projecting and provided respectively with a tool and a pulley, annular roller bearings in said casing between it and the spindle and adjacent the said tool and the said pulley respectively, said casing having an opening through its wall upon the side at which the tool engages the work and near said bearing adjacent said tool, a segmental pressure-shoe engaging said spindle at a point nearer to said bearing adjacent said tool than to said other bearing and provided with an interiorly-threaded stud loosely extending into said casing-opening, said shoe also having spring-seats at the sides of said stud, and springs in said seats and bearing against said casing and said shoe, whereby when the spindle-end adjacent the pulley and the bearing parts about that end are closely held upon the casing by pressure exerted in the direction opposite to that exerted upon the tool by the work the pressure-shoe constantly presses the opposite spindle-end and its bearing parts closely upon the casing by pressure exerted in the direction of that exerted by the work upon the tool; substantially as described.

3. In a device of the character described, a spindle having a working tool at one end, spaced antifriction bearings for supporting the spindle, a housing for the bearings and the spindle, a pad engaging the spindle between the antifriction bearings for holding the spindle against the bearings, a stud fixed to the pad to fit an opening in the housing, said stud having a threaded opening accessible through the opening in the housing; substantially as described.

In testimony whereof we hereunto affix our signatures.

WILLIAM H. CHAPMAN.
PHILIP H. HUTCHINSON.